United States Patent

Lykken

[19]

[11] Patent Number: 5,924,503
[45] Date of Patent: Jul. 20, 1999

[54] OFFSET WORK VEHICLE DRIVE SYSTEM

[75] Inventor: Thomas G. Lykken, Fargo, N. Dak.

[73] Assignee: Case Corporation, Racine, Wis.

[21] Appl. No.: 08/761,667

[22] Filed: Dec. 6, 1996

[51] Int. Cl.[6] .................................................. B62D 11/10
[52] U.S. Cl. ..................... 180/6.7; 180/9.62; 180/9.44; 180/9.21; 475/198
[58] Field of Search ..................... 475/230, 198, 475/200, 231, 243, 331; 180/9.1, 9.44, 9.46, 9.21, 9.26, 6.2, 6.7, 6.64, 9.62, 418, 419

[56] References Cited

U.S. PATENT DOCUMENTS

| | | | |
|---|---|---|---|
| 3,150,531 | 9/1964 | Singer | 180/376 |
| 3,420,327 | 1/1969 | Nallinger et al. | 180/375 |
| 3,690,396 | 9/1972 | Colosimo | 180/9.1 |
| 3,937,289 | 2/1976 | Dickinson | 180/9.44 |
| 4,313,516 | 2/1982 | Terry | 180/9.26 |
| 4,448,273 | 5/1984 | Barbieri | 180/9.21 |
| 4,870,820 | 10/1989 | Nemoto . | |
| 4,903,545 | 2/1990 | Louis et al. . | |
| 4,905,472 | 3/1990 | Okada . | |
| 4,914,907 | 4/1990 | Okada . | |
| 4,932,209 | 6/1990 | Okada et al. . | |
| 4,953,426 | 9/1990 | Johnson . | |
| 4,966,242 | 10/1990 | Baillargeon | 180/9.44 |
| 4,986,073 | 1/1991 | Okada . | |
| 5,010,733 | 4/1991 | Johnson . | |
| 5,042,252 | 8/1991 | Havens et al. . | |
| 5,067,933 | 11/1991 | Hardesty et al. . | |
| 5,078,659 | 1/1992 | von Kaler et al. . | |
| 5,090,949 | 2/1992 | Thoma et al. . | |
| 5,203,169 | 4/1993 | Ishii et al. . | |
| 5,312,176 | 5/1994 | Crabb . | |
| 5,377,487 | 1/1995 | Azuma et al. . | |
| 5,533,587 | 7/1996 | Dow et al. | 180/235 |

Primary Examiner—Lanna Mai
Assistant Examiner—Avraham H. Lerner
Attorney, Agent, or Firm—Foley & Lardner

[57] ABSTRACT

A drive system for a work vehicle is provided having a differential gearbox with an output pinion coupled to a bull gear where the bull gear is coupled to an axle and the axle rotates about an axis below that of the bull pinion's rotational axis. The axle is engaged to a drive gear which is in turn coupled to a track. The differential may have two such axles coupled to two suspensions, and may be a part of an articulated vehicle. The vehicle may have two such differentials and suspension arrangements, one in a front frame of the articulated vehicle and one in a rear frame.

6 Claims, 5 Drawing Sheets

5,924,503

OFFSET WORK VEHICLE DRIVE SYSTEM

FIELD OF THE INVENTION

The present invention relates generally to an offset work vehicle drive system. More particularly it relates to an offset axle arrangement for a work vehicle suspension system.

BACKGROUND OF THE INVENTION

Tracked vehicle drive systems have a different arrangement of drive elements than wheeled vehicle drive systems. A tracked system typically consists of a track, one or more idler wheels, and a drive wheel. The drive wheel is coupled to a drive axle extending from the vehicle, and is also coupled to, and drives, a track. The drive wheel may have "teeth" or other elements on its outer surface to engage and positively drive the track. Alternatively, the drive wheel may engage the track strictly with frictional contact. To provide sufficient frictional engagement, the inner surface of the track is in contact with the drive wheel and the outer surface of the drive wheel usually has an outer polymeric surface, such as rubber. It is critical to design a system that provides sufficient friction between the drive wheel and the track. One method of accomplishing this is to provide a drive wheel at one end of the track and an idler wheel at another end of the track. Such an embodiment is shown in U.S. Pat. No. 5,312,176. A major drawback of this is the size of the components used. As can be seen in the '176 patent, the drive wheel has over 180 degrees of its surface in contact with the track, and thus has sufficient frictional engagement. However, due to the ground clearance necessary for a work vehicle, the drive axle must be elevated and consequently, the entire drive wheel itself is quite large. This design, due to the large drive wheel, prevents a pair of tracks from being installed on the same side of the vehicle (one towards the front and one towards the rear of the vehicle). Without two tracks on the same side of the vehicle, a four track articulated vehicle cannot be constructed. An alternative suspension configuration employs a smaller drive wheel located above and between two idler wheels, such as the wheel arrangement shown generally in FIG. 1. This arrangement, however, reduces the angular contact of the track about the periphery of the drive wheel, and thus reduces the frictional engagement area between the drive wheel and the track. Consequently, this wheel and track arrangement is used most commonly for tracked suspensions in which the drive wheel is mechanically interlocked with the track, and not for suspensions in which the drive wheel D is frictionally engaged to the track T. To provide more frictional contact and thus gripping force between track T and drive wheel D, drive wheel D can be elevated as shown in FIG. 1 in dished lines. The angle phi of contact of the drive wheel D with respect to the track is clearly greater when drive wheel D is elevated. Moving the drive wheel upward, however, requires that one move drive wheel D's axle upward. If a standard differential with a planetary output stage is employed, this also requires that the differential be moved upward. The net effect is to elevate the center of mass of the vehicle, which makes it more unstable.

An apparatus is needed that will provide for more effective frictional coupling of the drive wheel and the track, yet will not elevate the center of mass of the vehicle. Preferably, an apparatus is needed that will allow the drive wheel to be elevated for better friction, but will not require that the differential be raised as well. The present invention provides such an apparatus.

SUMMARY OF THE PRESENT INVENTION

The present invention provides a novel offset work vehicle drive system that provides for the above needs.

Thus, in accordance with a first embodiment of the invention, a drive system for a work vehicle is provided, including a differential gearbox with a first output pinion engaged to an axle offsetting means on an axle such that the axles are horizontal and the rotational axis of the pinion is below the rotational axis of the axle and axle offsetting means, a drive wheel coupled to the axle and a track engaged to the drive wheel. A second similar pinion, axle offsetting means, axle, drive wheel and track arrangement may also be provided extending from the differential. Each track may engage two idler wheels which are preferably disposed below and to the front and rear (respectively) of its corresponding drive wheel. Two of these differentials with tracks may be provided in a single articulated work vehicle, preferably with one differential in the front frame of the vehicle, and the other differential in the rear frame.

Other principal features and advantages of the invention will become apparent to those skilled in the art upon review of the following drawings, the detailed description and the appended claims.

Figure 1:
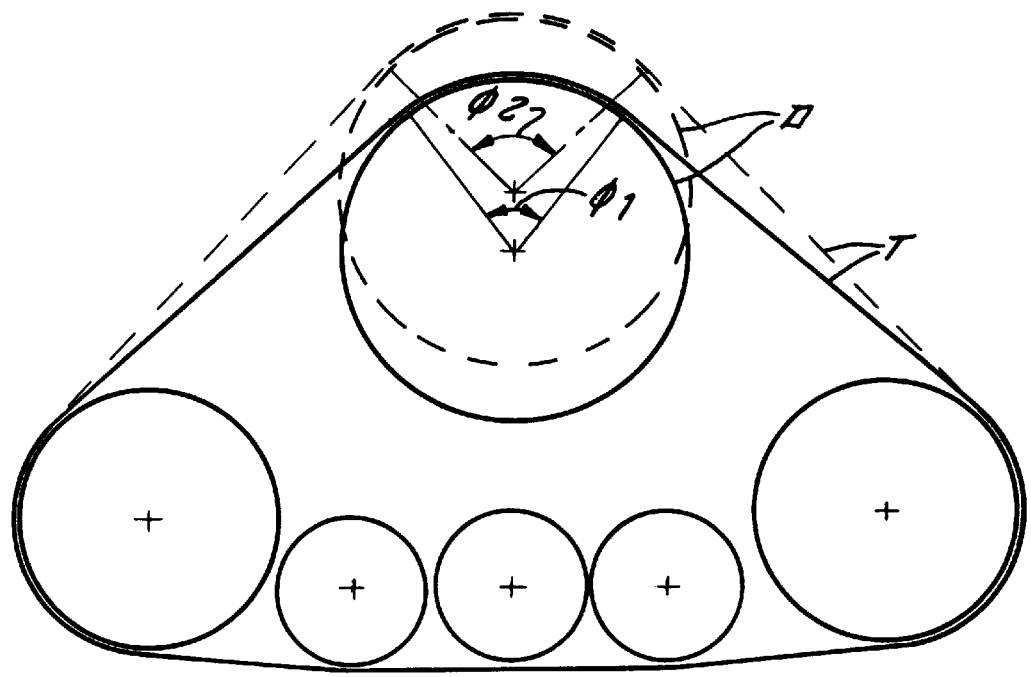
FIG. 1 is a side view of two tracked vehicle wheel arrangements.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
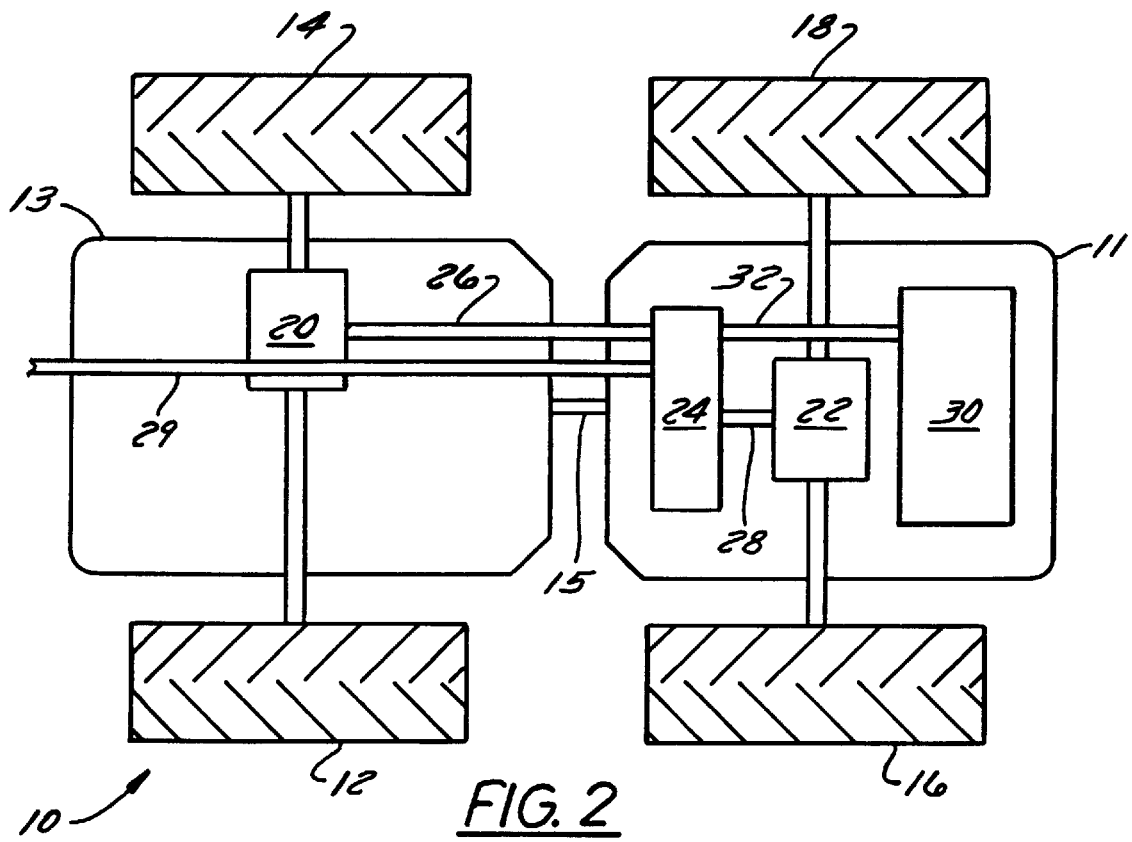
FIG. 2 is a schematic representation of an articulated vehicle.

The subject of this application is generally a drive system for a work vehicle. FIG. 2 is a top schematic view of an articulated tracked work vehicle 10 with front frame 11 and rear frame 13 pivotally coupled by flexible link 15. Vehicle 10 has four tracked suspensions 12, 14, 16 and 18. Suspensions 12 and 14 are rotationally coupled to and driven by differential 20 and suspensions 16 and 18 are rotationally coupled to and driven by differential 22. A transfer case 24 is coupled to and drives differentials 20 and 22 by drive shafts 26 and 28, respectively. Transfer case 24 transmits power to the drive shafts 26, 28 that it receives from engine 30 through drive shaft 32. Differential 20 is coupled to rear frame 13. Differential 22, transfer case 24 and engine 30 are coupled to front frame 11.

Power take off shaft 29 is also driven by transfer case 24. It is preferably disposed above differential 20 and between the axle offsetting structures identified more clearly in the succeeding figures. Similarly, a portion of engine 30 is also preferably disposed above front differential 22 and between the axle offsetting structures of that differential 30. This can be seen more clearly in FIG. 3.

Figure 3:
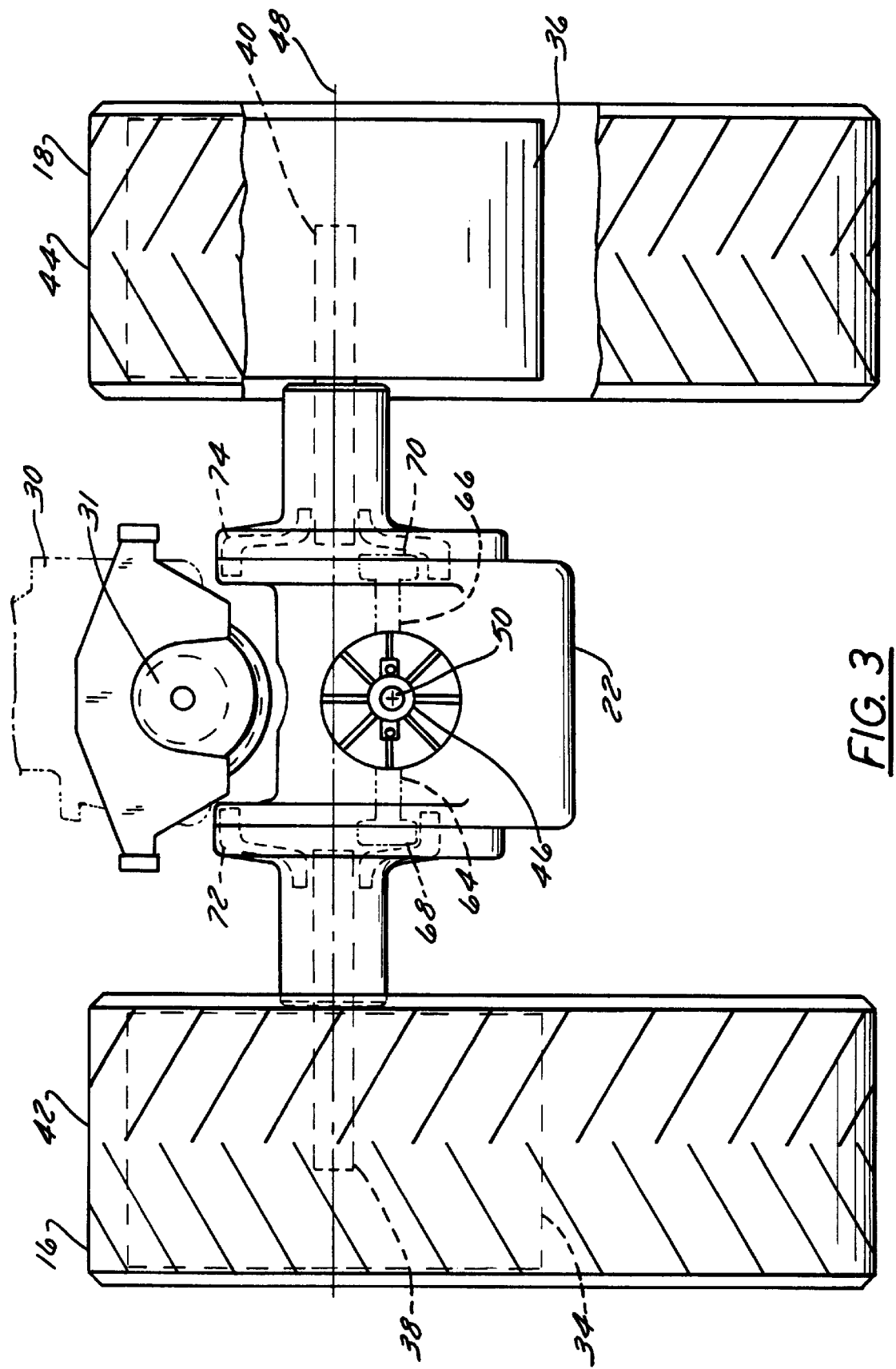
FIG. 3 is a phantom view of a front differential and suspension.

FIG. 3 is a phantom view of front differential 22 showing suspensions 16 and 18 coupled to drive wheels 34, 36, disposed on horizontally opposed coaxial drive axles 38, 40, respectively, which extend from inside opposing sides of differential 22. Tracks 42, 44 are frictionally coupled to drive wheels 34, 36, respectively. In this view, the idler wheels and roller wheels in each suspension have been omitted for clarity. Drive axles 38, 40 are rotated by internal bull gears 72, 74, respectively, which in turn are rotated by respective pinion gears 68, 70, as discussed more fully below. Drive shaft 28 (FIG. 2) is coupled to input shaft 46 on the back of the transmission. Both drive wheels 34, 36 and drive axles 38, 40 share a common axis of rotation, indicated here by centerline 48. This axis 48 is disposed above, and at right angles to the rotational axis 50 of input shaft 46. Although this figure illustrates suspensions 16 and 18 with respect to differential 22, the same arrangement is used for the rear suspensions 12, 14 and the rear differential 20.

Also shown in FIG. 3 are engine 30 and engine flywheel 31, both disposed on top of differential 22. By offsetting drive axles 38, 40 from rotational axis 50 of input shaft 46 in the manner shown, engine 30 and engine flywheel 31 may be lowered and disposed between internal bull gears 72 and 74. This arrangement of placing drive axles 38, 40 above stub axles 64, 66, which extend from input shaft 46, is advantageous, since it increases the frictional contact and gripping force between tracks 42, 44 and respective drive wheels 34, 36 without elevating the height of the vehicle. The arrangement also allows a power take-off shaft to be disposed between bull gears 72 and 74 of rear differential 20 in a manner similar to engine 30 and engine flywheel 31 in front differential 22.

Figure 4:
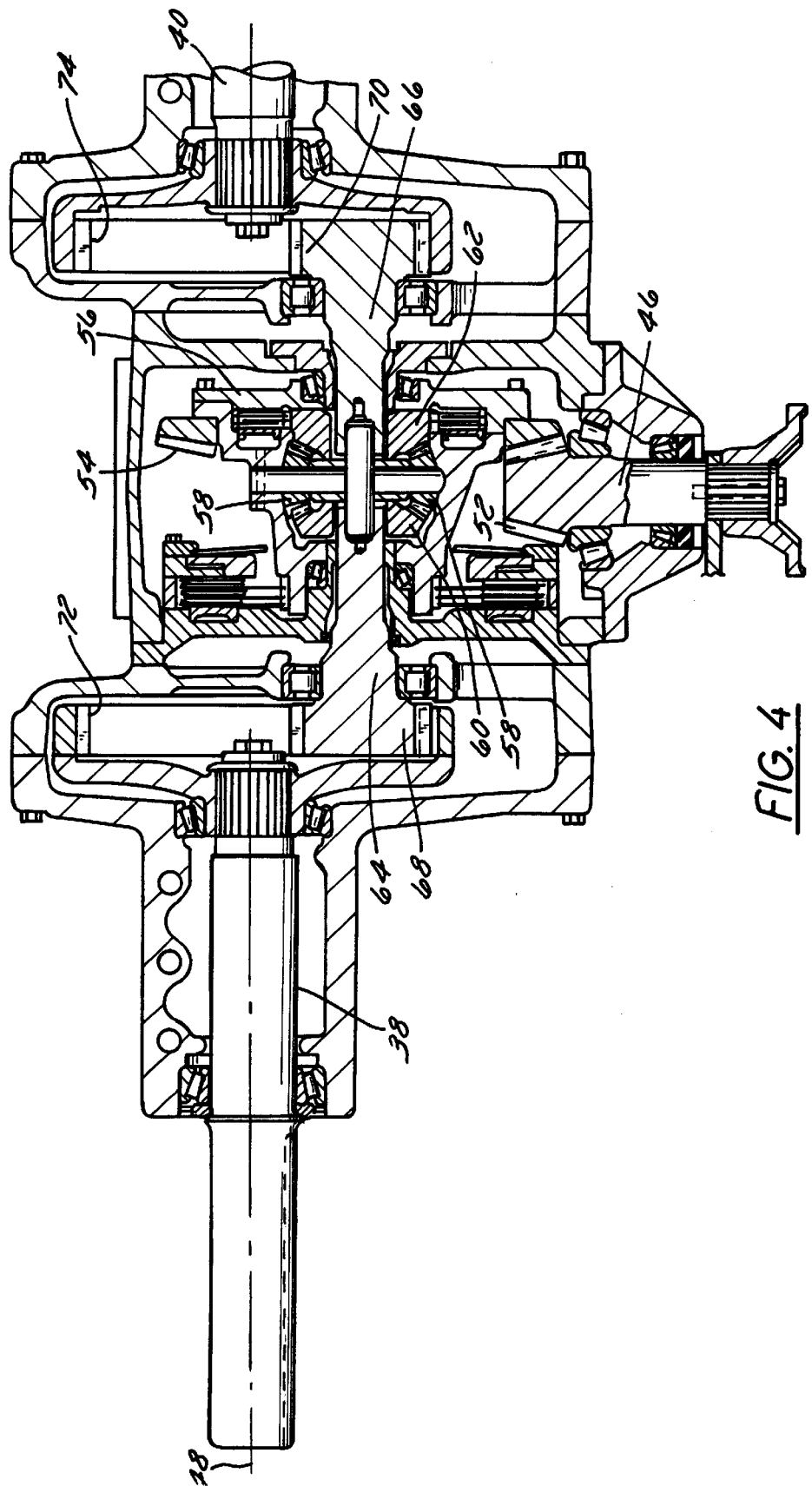
FIG. 4 is a cross-sectional view of a rear differential.

FIG. 4 illustrates a partial cross-sectional front view of differential 20. In this figure, the input shaft 46 and the input pinion are illustrated out of their correct position to more clearly show the interrelationship of the various differential components. Input shaft 46, shown here in cross-section and extending downwardly, should be extending out of FIG. 4 toward the viewer, similar to its illustration in FIG. 3. Drive shaft 26 (FIG. 2) is coupled to input shaft 46 on the front of the transmission.

Input shaft 46 is engaged to bevel pinion gear 52 which drives bevel gear 54. Bevel gear 54 is fixed to differential housing 56, which rotates together. Differential housing 56 rotationally supports spider gears 58 which in turn engage bevel gears 60 and 62, which are mounted on the innermost ends of stub axles 64, 66, respectively. Stub axles 64, 66 are coupled to pinion gears 68, 70, respectively. Pinion gears 68, 70 are engaged to internal bull gears 72, 74, respectively. Bull gears 72, 74 are coupled to drive axles 40, 38, respectively. Drive wheels 34, 36 to which drive axles 38, 40 are coupled are not shown in FIG. 4.

As shown in FIGS. 3 and 4, drive axles 38, 40, have rotational axis 48 disposed above the rotational axis of stub axles 64, 66 and differential housing 56. For a work vehicle such as a tractor or harvester, the preferred upward offset of the drive axles 38, 40 with respect to rotational stub axles 64, 66 is between 4 and 12 inches. The corresponding preferred gear ratio between pinion gears 68, 70, and their respective bull gears 72, 74 is between 0.5 and 0.25. The corresponding preferred outer diameter of internal bull gears 72, 74 is between 14 and 20 inches. Although differential 20 is illustrated in FIG. 4, a similar differential and axle arrangement is also preferred for differential 22.

Figure 6A:
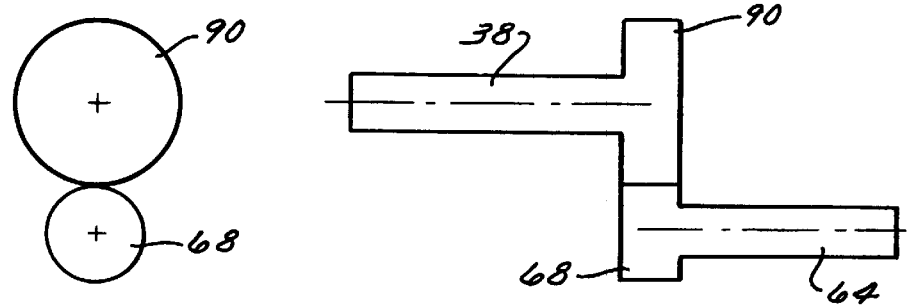
FIG. 6A is an alternative arrangement for offsetting axles shown in FIGS. 3–4.

As will be appreciated by one skilled in the art, drive axles 38, 40 may be offset from respective stub axles 64, 66 by means other than internal bull gears 72, 74. Four alternative axle offsetting configurations are shown in FIGS. 6A–6D. Although these figures illustrate the left side of differentials 20, 22 (drive axle 38 and stub axle 64), the same arrangement, only flipped, is used for the right side (drive axle 40 and stub axle 66). In FIG. 6A, stub axle 64 is coupled to pinion gear 68. Pinion gear 68 engages an external bull gear 90. External bull gear 90 is coupled to and rotates drive axle 38.

Figure 6B:
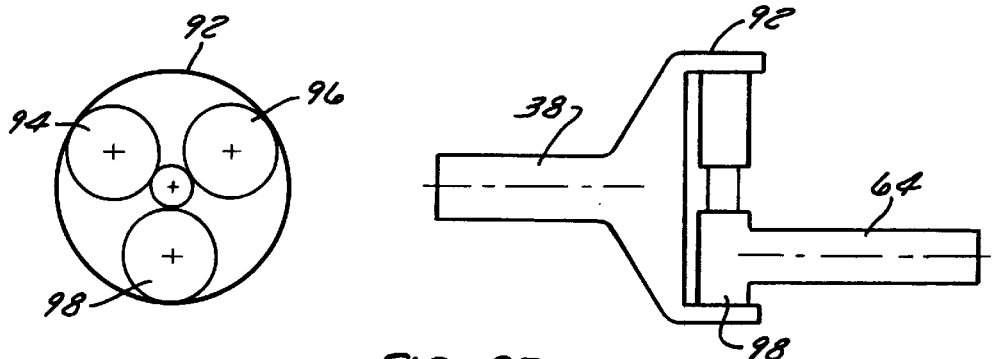
FIG. 6B is a second alternative arrangement for offsetting axles shown in FIGS. 3–4.

FIG. 6B illustrates a planetary gear system 92 for offsetting drive axles 38, 49 from stub axles 64, 66. Planetary gear system 29 includes three planetary gears 94, 96, 98. Stub axle 64 is coupled to planetary gear 98. Planetary gear system rotates drive wheel 34 (not shown) through drive axle 38.

Figure 6C:
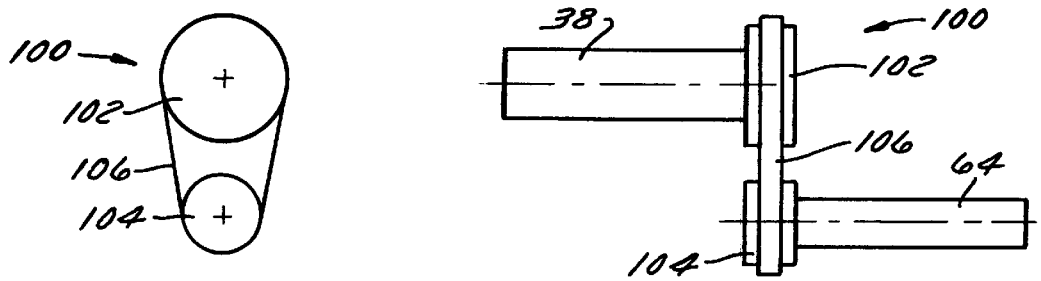
FIG. 6C is a third alternative arrangement for offsetting axles shown in FIGS. 3–4.

In FIG. 6C axles are offset by means of a chain system 100. Chain system 100 includes a chain wheel 102 which rotates drive axle 38. Stub axle 64 is coupled to a stub wheel 104. A chain 106 engages both stub wheel 104 and chain wheel 102. Thus, rotation of stub axle 64 and stub wheel 104 is translated to rotation of chain wheel 102 and drive axle 38 through chain 106.

Figure 6D:
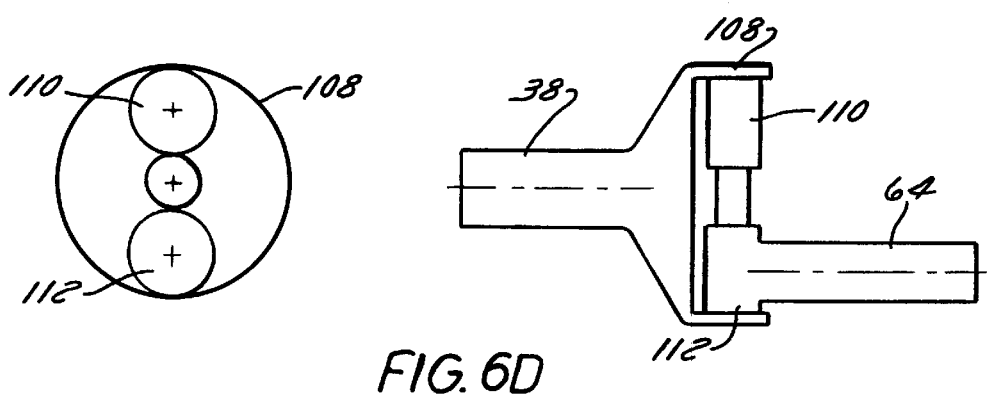
FIG. 6D is a fourth alternative arrangement for offsetting axles shown in FIGS. 3–4.

A final axle offsetting arrangement is illustrated in FIG. 6D. This configuration includes a planetary gear system 108 having two planetary gears 110, 112. Planetary gear 112 is coupled to stub axle 64. Planetary gear system 108 rotates drive wheel 34 (not shown) through drive axle 38.

Figure 5:
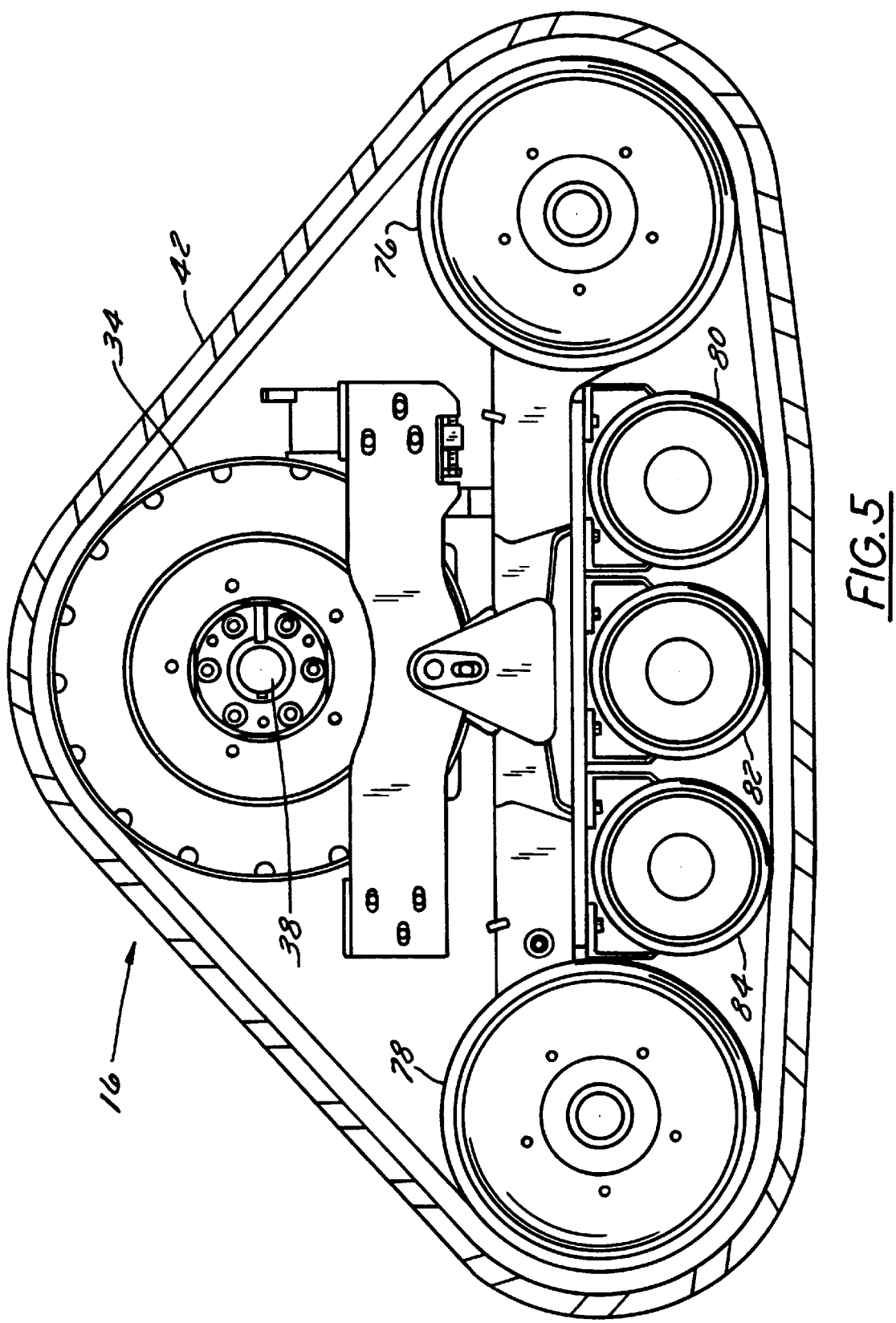
FIG. 5 is a side view of any suspension shown in FIGS. 1–3.

FIG. 5 is a side view of suspension 16, showing the arrangement of various suspension components. A detailed description of the suspension can be found in the inventor's co-pending application entitled "Vehicle Track Undercarriage Adjustment System," U.S. Ser. No. 08/745,373, filed on Nov. 8, 1996. Suspensions 12, 14 and 18 are similarly arranged. Drive wheel 34 is fixed on axle 38 such the axle 38 rotates drive wheel 34. Track 42 is frictionally engaged with drive wheel 34 along an arc of about 98 degrees, preferably between 90 and 120 degrees. As drive wheel 34 rotates, it moves track 42 clockwise, toward idler wheel 76. Idler wheel 76 is the forwardmost wheel of suspension 16, and idler wheel 78 is the rearwardmost wheel of suspension 16, with three roller wheels 78, 80 and 84 disposed between them. The rotational axes of idler wheels 76 and 78 are spaced preferably between 60 and 100 inches apart, and rotational axis 48 of drive wheel 34 is preferably spaced between 20 and 32 inches above the rotational axes of idler wheels 76, 78 to provide the proper angle of engagement of track 42 with drive wheel 34.

Thus, it should be apparent that there has been provided in accordance with the present invention an offset work vehicle drive system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An articulated work vehicle, comprising:

a front frame;

a rear frame pivotally coupled to the front frame;

front and rear differential gearboxes coupled to front and rear frames, respectively, each gearbox including two output pinions having a substantially horizontal rotational axis; and two axles having a substantially horizontal rotational axis, each axle including an axle offsetting means rotationally coupled to one of the two output pinions, wherein the rotational axis of each of the plurality of axles is above the rotational axis of the output pinion to which each axle is coupled; and a plurality of tracked suspensions, each such suspension including, a drive wheel rotationally engaged to one of the plurality of axles, a track engaged to the drive wheel, and an idler wheel engaged to the track.

2. The articulated work vehicle of claim 1, wherein the two axles of the front gearbox share a common rotational axis and extend from opposing sides of the articulated vehicle, and wherein the two axles of the rear gearbox share a common rotational axis and extend from opposing sides of the articulated vehicle.

3. The articulated work vehicle of claim 1 wherein the axle offsetting means includes an external bull gear.

4. The articulated work vehicle of claim 1 wherein the axle offsetting means includes a plurality of planetary gears.

5. The articulated work vehicle of claim 1 wherein the axle offsetting means includes a chain and chain wheel.

6. The articulated work vehicle of claim 1 wherein the track is engaged to the drive wheel along an arc of between 90° and 120°.

* * * * *